United States Patent
Ahn et al.

(10) Patent No.: US 7,286,654 B1
(45) Date of Patent: Oct. 23, 2007

(54) METHOD FOR PREVENTING OVERLOAD CONDITION IN A CIRCUIT SWITCHED ARRANGEMENT

(75) Inventors: Soohan Ahn, Chatham, NJ (US); Vaidyanathan Ramaswami, Neshanic Station, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/415,795

(22) Filed: May 2, 2006

Related U.S. Application Data

(63) Continuation of application No. 10/322,043, filed on Dec. 17, 2002, now Pat. No. 7,068,766.

(60) Provisional application No. 60/410,538, filed on Sep. 13, 2002.

(51) Int. Cl.
  *H04M 15/00* (2006.01)
  *H04M 7/00* (2006.01)
(52) U.S. Cl. .............. 379/112.04; 379/112.1; 379/112.05; 379/221.03; 379/221.07
(58) Field of Classification Search ........... 379/112.03, 379/112.04, 112.05, 112.1, 221.03, 221.07; 370/229, 230, 230.1, 232, 235; 455/445, 455/453
See application file for complete search history.

(56) References Cited

U.S. PATENT DOCUMENTS 7,068,766 B1 *  6/2006  Ahn et al. ............. 379/112.04

* cited by examiner

*Primary Examiner*—Quoc Tran
(74) *Attorney, Agent, or Firm*—Henry T. Brendzel

(57) ABSTRACT

Congestion problems in networks are alleviated with a method that works toward insuring that unused capacity will always exist in elements of a network that are resources which are shared by a plurality of users and which, consequently, can be overloaded. In response to each request to establish a connection over a path in the network, pursuant to a predetermined algorithm the method services the request, declines to service the request, or services the request after dropping an established connection. In one embodiment, when unused capacity on the path is above a first preselected level, all requests are serviced. When unused capacity falls below a second preselected threshold, no requests are serviced. When unused capacity is between the first and second thresholds, an existing data connection is dropped if a requested connection is a voice connection and the number of existing data connections exceeds a preselected threshold.

1 Claim, 3 Drawing Sheets

METHOD FOR PREVENTING OVERLOAD CONDITION IN A CIRCUIT SWITCHED ARRANGEMENT

RELATED APPLICATION

The application is a Continuation of application Ser. No. 10/322,043 filed Dec. 17, 2002 now U.S. Pat. No. 7,068,766. This invention claims priority from Provisional application No. 60/410,538, filed Sep. 13, 2002. This invention is also related to U.S. patent application Ser. No. 10/026,083, filed Dec. 22, 2001, which is herein incorporated by reference.

BACKGROUND OF THE INVENTION

This invention relates to a method for preventing, or mitigating the effects of, an overload condition in a circuit switched telecommunication network. In some embodiments, such a network includes one or more arrangements where a group of client terminals are statistically multiplexed onto one or more transmission paths, the signals of active ones of the terminals are brought to a head end terminal (HET), and those signals are then communicated from the head end terminal to a central office switch of the network (henceforth, near-end office) over a shared transmission path. By statistically multiplexing of terminals onto the transmission paths it is meant that the transmission paths do not have sufficient capacity to service all terminals simultaneously. One example of such an arrangement is a network that employs a digital (subscriber) loop carrier system. Another example is a network that provides circuit switched telephony over hybrid-fiber coax (HFC). Still another example is a network where HET 20 is a PBX. In this example, however, terminals that are connected to the PBX are not employing a shared transmission resource in order to reach the PBX. Closely related to the above are arrangements that employ central office switch concentrators. In the context of this disclosure, therefore, a concentrator at the ingress of a near-end switch is considered to be a head end terminal.

In all such arrangements there exists an element that concentrates traffic from numerous client terminals onto a transmission path, but that path is capable of providing simultaneous service to only a fraction of the client terminals. Normally this is acceptable because not all client terminals are likely to need service at the same time, and the shared transmission path is engineered to have sufficient capacity to insure that the probability of a client terminal being denied service because the transmission path is full is below a chosen, specific, level.

One aspect of such prior art arrangements is that the near-end office provides the basic functions needed to establish connections, such as dial tone, digit detection, etc. Employing the dial tone generation and digit detection circuitry in the near-end office simplifies the architecture and reduces cost by avoiding duplication of features both at the HET and the near-end office. The disadvantage of this arrangement, however, is that when circuits in the shared transmission path are congested, new callers cannot connect to the near-end office and, therefore, do not even get a dial tone. Consequently, the client does not even dial out, or if dials, the dialed digits are not received, and that leads to difficulty in implementing intelligent admission controls. This condition, unfortunately, has been observed more and more in practice because, with the increased popularity of the Internet, more computers utilize the network, and computers connected to the Internet often have holding times (the time intervals between off-hook and on-hook) that are much longer than those that were expected when the shared transmission path were originally engineered.

The above describes one source by which congestion can occur at, or prior to, the near-end office. However, even in network arrangements that do not have a shared transmission path between client terminals and the switch at the near-end office (near-end switch, for short), congestion can occur, simply because of an extraordinary use of the near-end switch in response to some event, such a radio "call-in" contest. That can occur of course, when components of that near-end switch that are shared, such as a concentrator or a digit collector, become overloaded. It might also be caused by a large number of computer users whose computers automatically keep redialing a busy Internet Service Provider (ISP) modem bank in an effort to obtain a modem the moment one becomes free.

The central network (i.e., the network core excluding the near-end offices and their connections to users) is often protected from some of these overload conditions by means of a "choke" network. This is typically implemented with a limited number of trunks that are set up in a trunk group specifically for a "call-in" contest telephone number. Once these trunks are busy, the switch returns a re-order tone (fast busy) to any additional user attempting to access the "call-in" number. This protects the central switches from dealing with a large number of calls to a number that is almost certainly busy, and allows normal use of the core network. The end offices themselves are, however, not protected from rapid retries, except in the sense that a user is likely to give up after a few busy signals. Alas, the likelihood of giving up quickly has shrunk in recent years because many telephones have redial buttons (and computers have modern software that has redial options) which permit redialing with a very small effort on the part of the user. Moreover, the re-tries have become more closely spaced in time.

SUMMARY

Congestion problems in networks are alleviated with a method that works toward insuring that unused capacity will always exist with very high probability in elements of a network that are resources which are shard by a plurality of users and which, consequently, can be overloaded. In response to each request to establish a connection over a path in the network, pursuant to a predetermined algorithm the method either services the request, declines to service the request, or services the request after dropping an established connection. In one embodiment, when unused capacity on the path is above a first preselected level, all requests are serviced. When unused capacity falls below a second preselected threshold, no requests are serviced. When unused capacity is between the first and second thresholds, an existing data connection is dropped if a requested connection is a voice connection and the number of existing data connections exceeds a preselected threshold. Other embodiment may employ a different algorithm for which call to drop, such calls having a duration that is in excess of a preselected threshold

DETAILED DESCRIPTION

Figure 1:
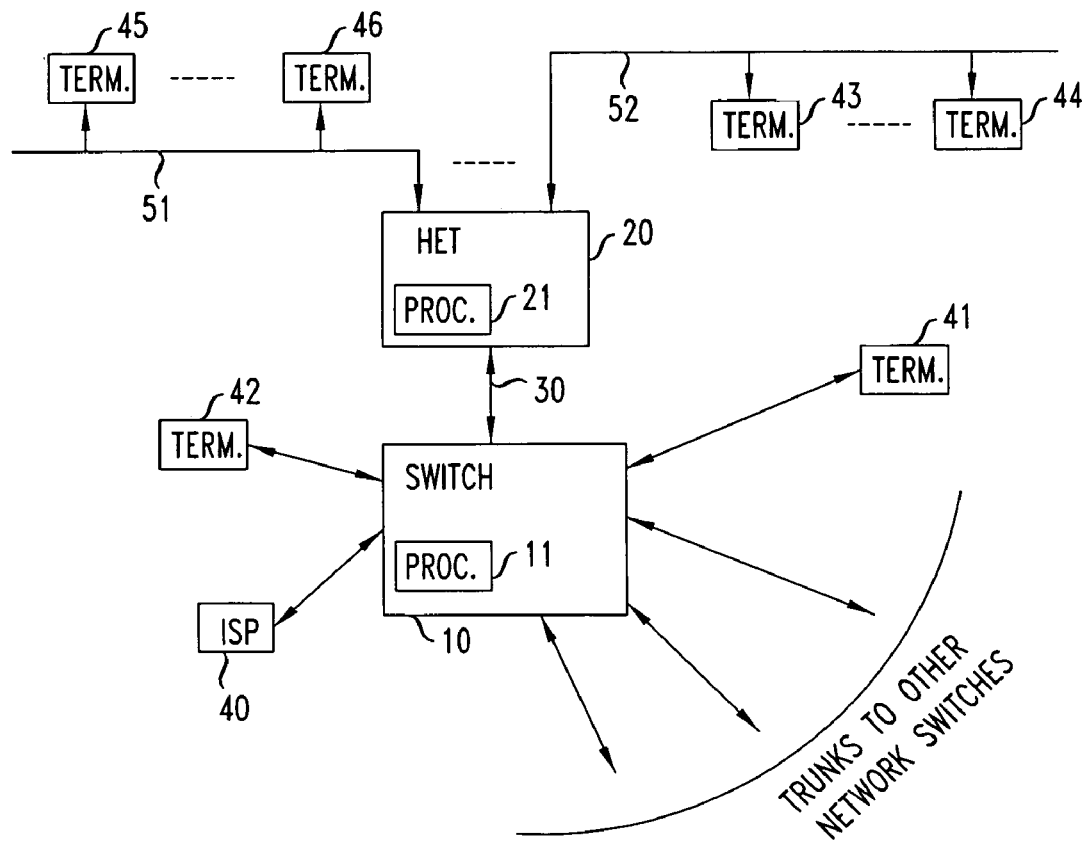
FIG. 1 illustrates a physical arrangement of a network switch that is coupled to terminals directly, as well as indirectly, through a head end terminal.

FIG. 1 presents a diagram of an illustrative arrangement where the principles disclosed herein can be practiced. In includes switch 10 (with processor 11), which is a near-end switch of a network that, on the trunk side, is connected to other switches of the network. Terminals 41 and 42 are connected directly to switch 10, as well as ISP 40. Additionally, shared path 30 connects HET 20 to switch 10. HET 20 includes a processor 21 that performs all of the processing needed in HET 20. Terminals 45-46 are connected to HET 20 via path 51, and terminals 43-44 are connected to HET 20 via path 52. Paths 51 and 52 may be, for example, hybrid-fiber coax systems, shared among the terminals. Henceforth, terminals 43-46 are termed "downstream" terminals, and paths 51 and 52 are termed "downstream" paths. Of course, an arrangement like the one shown in FIG. 1 can have more than two downstream paths. HET 20 concentrates the signals on each of the downstream paths (multiplexing action) and further concentrates the signals of the downstream paths onto shared transmission path 30 (also multiplexing action), and correspondingly demultiplexes signals on their way from shared path 30.

One of the methods disclosed in the above-referenced Ser. No. 10/026,083 application describes a method that protects against transmission path congestion which, without some imposed access controls, can block access to switch 10 to the point that dial tone cannot reach a downstream terminal that seeks to initiate a call. This applies to congestion on paths 51 and 52 as well as to congestion on path 30. Central to this method is the notion that a call can be conceptually divided into an initial "attempt" period and a subsequent "communication" period. During the attempt period, a downstream terminal receives a dial tone from switch 10 and forwards dialed number digits to switch 10. The communication period begins when switch 10 effectively accepts the call by starting to route the call to the dialed number. Necessarily, the method contemplates that, at all times, with very high probability, an available (i.e., unoccupied) channel exists on the paths 30 and 51 and on the paths 30 and 52, and that a mechanism is provided to assure this.

In accordance with one embodiment of this method, any downstream terminal coupled to path 51 (or coupled to path 52) that wishes to initiate a call is granted one of the available path 51 (or path 52) channels and one of the available path 30 channels, receives a dial tone from switch 10, and proceeds to forward dialed number digits; i.e., engages in a call attempt. Based on the number of occupied channels (on path 30 and the downstream path to which the terminal initiating the call is connected), near-end office 10 decides whether or not to drop a call. The call dropped is a call that uses a channel on path 30 and a channel on one of the downstream paths. The set of calls that are considered for dropping includes all calls in the midst of their communication period as well as all calls in the midst of their attempt period. Some calls, on the other hand, may be exempt from such forced dropping, for example, 911 calls.

The above states categorically that a channel is granted in order to obtain dial tone and to forward dialed number digits to switch 10. However, one cannot guarantee that a channel will be always available to a downstream terminal that seeks to initiate a call, because it is possible that many of the inactive downstream terminals might wish to initiate a call essentially simultaneously. The best that can be done is to introduce a mechanism that works to maintain a high probability that a channel is always available. Indeed, in accord with the principles of this method, a call control mechanism is employed that works toward insuring that the capacity on path 30 does not fall below a preselected threshold, K1, and that capacity on paths 51 and 52 does not fall below preselected thresholds $L1_{51}$ and $L1_{52}$, respectively. This is accomplished by making two independent component decisions relative to a call attempt by a terminal: one related to path 30, and one related to the downstream path through which the terminal is making the call attempt (e.g., path 51). A call is dropped when either one of the two decisions is to drop a call. Stated in other words, if a conclusion by a component decision to drop a call is designated by a logical "1", then the final decision of the method is the logical OR function of the two component decision logical values. Of course, by the nature of the OR function, when the first component decision that is made corresponds to logical "1," the second component decision does not need to be undertaken.

One embodiment of this mechanism (algorithm) employs two threshold values, for example, K2 and K1 in connection with path 30. When remaining capacity is below K2, a first algorithm is employed in the decision to drop a call. When capacity is between thresholds K1 and K2 (inclusive of K2 and K1), a second algorithm is employed in the decision to drop a call. Lastly, when capacity is larger than K1, no calls are dropped. These algorithms can be deterministic, or probabilistic. An example of a deterministic approach is one where the first algorithm accepts the new call but drops an existing call, while the second algorithm declines to accept the new call.

Figure 2:
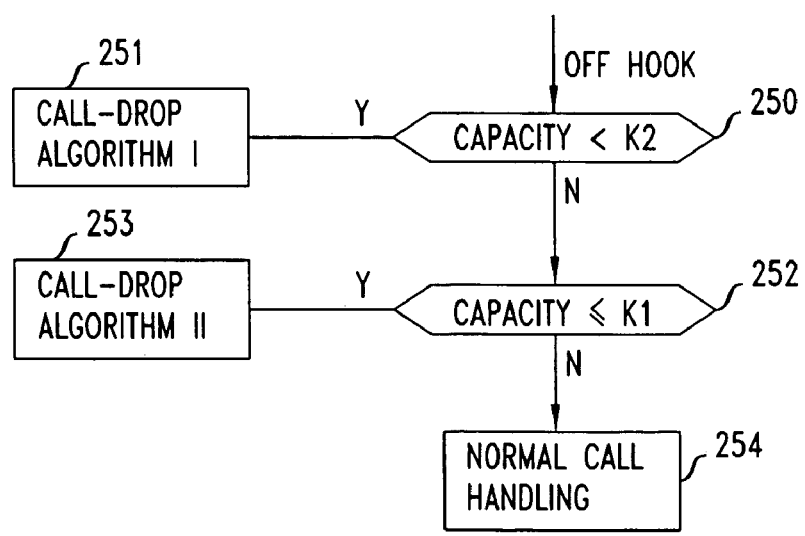
FIG. 2 presents a flow diagram, which works to assure an always existing capacity for attempting new calls.

FIG. 2 is a flow chart of this algorithm. An incoming call initiates step 250, which decides whether spare capacity is less than K2. In such an event, control passes to step 251, where a first call-dropping algorithm is executed. When spare capacity is greater than K2, control passes to step 252, where it is determined whether spare capacity is less than K1 (K1 being greater than K2). In such an event, control passes to step 253 where a second call-dropping algorithm is executed. When spare capacity is greater than K1, control passes to step 254, where normal call handling takes place (without call dropping).

To give an example, the step 251 algorithm may be: drop call attempt, unless it's an emergency call, in which case drop some other call. A corresponding example for step 252 algorithm may be: if the call attempt is a voice call, drop an existing data call. Otherwise drop the incoming call attempt.

Figure 3:
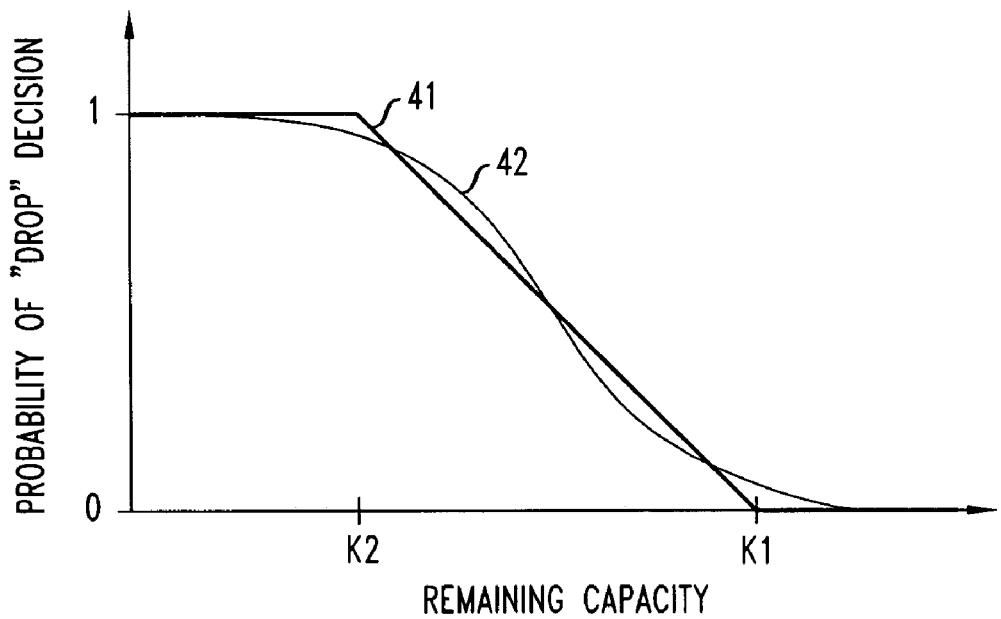
FIG. 3 describes two curves that may be employed in a congestion control method for the FIG. 1 arrangement to execute the FIG. 2 method.

FIG. 3 presents a curve 41 that embodies one implementation of the mechanism, which corresponds to a probabilistic approach to the drop/no drop decision. When capacity on path 30 is greater than K1, the probability of a decision to drop a call is zero. When capacity on path 30 is equal to or less than K1 but also equal to or greater than K2, the probability of a decision to drop a call is between zero and 1 and increasing toward 1 as capacity decreases. When remaining capacity on path 30 is less than K2, the probability of a decision to drop a call is 1 (i.e., a certainty). In may be appreciated that the probability curve between K1 and K2 need not be linear and that, in fact, one can dispense with the explicit thresholds K2 and K1 by employing an appropriately selected probability function, such as the one depicted by curve 42. In practice, however, employing thresholds K2 and K1 results in a lower computational burden. A similar two-threshold scheme may be employed over paths 51 and 52 to control congestion on those paths. Also, the parameters set may be set differently for different paths.

For those instances where a decision to drop a call is made (because either one of the above-mentioned component decisions reaches a decision to drop a call), a selection of the call to be dropped must be made. When a decision to drop results from the component decision that involves path 30 (i.e., involving thresholds K2 and K1), the set of calls from which a call to be dropped is selected comprises all calls on path 30 (those in the midst of their attempt period and those in the midst of the communication period). When a decision to drop results from the component decision that involves a downstream path (for example, involving thresholds $L1_{51}$ and $L2_{51}$ on path 51), the set of calls from which a call to be dropped is selected comprises all calls on the downstream path to which the terminal making the call attempt is connected.

Any chosen decision schema for selecting the particular call to be dropped is permitted, and the following presents a number of such schemas, which can be employed severally, or in combination:

calls involving two or more channels in the resource that triggered the decision to drop a call.
Oldest data call from the set of existing data calls.
Oldest data call from the set of existing data calls, but only if its elapsed holding time is larger than N seconds.
Oldest call of any type.
Oldest call of any type, but only if its elapsed time is larger than N seconds.
A random data call.
A random data call, from the set of calls with elapsed holding time larger than N seconds.
A random call.
A random call, from the set of calls with elapsed holding time larger than N seconds.
A call that finished its attempt period, but waiting to start communication with called party.
A random call in midst of a call attempt.

Of course, additional criteria may be added by those skilled in the art. As mentioned above, for example, some calls might be exempted from forced dropping.

It should be understood that the term "data call" as used herein is illustrative of, and encompasses, all calls where persons using the FIG. 1 arrangement do not necessarily expect real-time transmission of information. Conversely, the term "voice call" as used herein is illustrative of, and encompasses, all calls where persons using the FIG. 1 arrangement do expect real-time transmission of information.

To implement the above method in processor 11, the processor needs to know about the available (i.e., remaining, unoccupied) capacity on path 30 and about the available capacities on paths 51 and 52. Switch 10 knows the remaining, unoccupied, capacity on path 30 because the path is coupled directly to processor 11. As for the remaining, unoccupied, capacity on paths 51 and 52, HET 20 must inform processor 11 of the maximum capacity on the downstream paths, if the maximum capacity is alterable, and processor 11 must know which downstream terminals are coupled to which downstream paths. Since a call attempt identifies the downstream terminal that is making the call attempt, it follows that a lookup table in processor 11 associating downstream terminals with downstream paths would do. Alternatively, of course, HET 20 can identify to switch 10 the downstream path from where the call attempt is made, as the attempt is being made.

Further, processor 11 needs to have the ability to drop calls in switch 10 and to cause HET 20 to drop calls and release corresponding channels on the downstream path of the dropped calls. That capability is inherent in the normal operation of the FIG. 1 switch 10 and in the normal switch 10-HET 20 interactions. That is, any signaling interface that is employed between switch 10 and HET 20 for the normal operation of the FIG. 1 arrangement, such as GR.303 or TR.303, can be used to implement the signaling needs of this method.

Still further, processor 11 must have the necessary information for making the call selection. For some of the decision schemas listed above, in connection with each of the calls that is included in the set of calls from which a call to be dropped is selected, processor 11 needs to know the call's type and duration. Knowledge of a call's duration is, again, inherent in the normal operation of switch 11, but the call's type—that is, whether the call is a data call or a voice call—is not. As for established calls, a call's type can be ascertained from one or more of the following call attributes: (a) calls that carry "modem tones" are data calls, and (b) calls that are marked by periods of relatively low power are voice calls (such low power periods result from breathing pauses and/or normal conversation patterns where one person speaks for some time while the other is quiet, and vice versa). In addition, a call's type can be sometimes ascertained—in the case of both established calls, and calls that are in the midst of their attempt period—from (c) the called number, and (d) the calling number. Information that imparts a call type based on calling and called number can be provided to processor 11, or can be derived by processor 11 from accumulated (historical) information. An example of (c) is a called number that is known to be a modem pool of an Internet Service Provider (ISP), or from a home office telephone line that is known to be used for computer communication. An example of (d) is a home line that is found to be used exclusively by a computer, or almost exclusively, from prior determinations of the call type that the particular calling party terminal carried.

The above-disclosed method can be also executed in processor 21 but, of course, processor 21 must have the same information, and the same control capabilities that are needed in processor 11 and that are described above. That is not a problem because processor 21 can keep track of the spare capacity on path 30, and as part of its operations relative to terminals 43-46 keeps track of the spare capacity on paths 51 and 52, and has the capability to drop calls. Also, call-type information can be obtained from processor 11, or compiled locally by processor 21. Of course, processor 21 must also have the capability to perform the necessary computations and decisions, but those capabilities are quite modest for this method.

It should be understood that when the number of available channels in path 30 is less than or equal to K1 and a decision is to accept the attempted call, but only if an existing call is to be terminated, one can first accept the call, and then terminate whatever existing call the algorithm of step 253 chooses or, alternatively, first terminate whatever existing call the algorithm of step 253 chooses and then accept the attempted call. Once can even choose to terminate an existing call before the determination is made whether to accept or not accept the attempted call. Of course, the downside of this approach may be that a terminated call is a voice call and the accepted call is a data call that, typically, is not what is deemed desirable.

The above discloses an approach where, effectively, there is a serial connection of communication elements that is interposed between a collection of terminals and a switch; for example, path 51, HET 20, path 30. As described, path 51 is a shared resource that can be overloaded, and path 30 is a shared resource that can be overloaded. Without loss of generality it can be assumed that the resources of HET 20 cannot be overloaded. In such a case, with respect to possible overload conditions, it can be said that the described example comprises two shared overloadable resource arrangements, where a shared overloadable resource (SOR), or an overloadable resource (for short), is a resource that, when employed with respect to a call, has an resource element occupied for the duration of the call, such as a communication channel. Arrangement 1 includes $SOR_1^{30}$, which is the first member of the arrangement—that being path 30, and $SOR_1^{51}$, which is the second member of the arrangement—that being path 51. Arrangement 2 includes $SOR_2^{30}$, which is the first member of the arrangement—that being path 30, and $SOR_2^{52}$, which is the second member of the arrangement—that being path 52. Path 30 has $Q^{30}$ resource elements, path 51 has $Q^{51}$ resource elements, and path 52 has $Q^{52}$ resource elements. Thus, a call from terminal 45, which connects to switch 10 over the first arrangement, might occupy resource element $SOR_1^{30}(q)$, where q=1, 2, . . . or $Q^{30}$, for example q=12, and resource element $SOR_1^{51}(q)$, where q=1, 2, . . . or $Q^{51}$, for example q=7. Of course, the principles of this method apply to arrangements that contain a smaller number, or a larger number, of serially connected SORs. It should also be realized that other elements, such as HET 20, could constitute an SOR by virtue of the fact that those elements have overloadable resources (e.g., processor 21 may be placed in overload, and other components within HET 20 may also be statistically multiplexed).

The above focuses on the elements that are coupled to near-end office 10 and that use the near-end office as a gateway to the telecommunications network. However, the principles disclosed herein are applicable to elements within the network as well. Consider, for example, that end office 10 is connected via a trunk group to a particular toll or tandem switch. If the trunk group is nearly full (or in overload), beneficial result are achieved by engaging a process that, in response to a need to place an additional call on that trunk group, considers whether to drop an existing call that is serviced by that trunk group. Either near-end office 10 or the toll/tandem office can do the selective dropping but, normally, it would be preferable for the end offices to do this, for reasons of load and processing capability of the processors within the near-end office on the one hand, and the toll/tandem office on the other. A reasonable criterion for a call to be terminated is that it goes through a relatively large number of hops and therefore uses an unusually large amount of network resources. Dropping such a call is useful because by dropping a single call several other calls may be allowed to proceed.

The same sort of logic can be applied between toll switches. Currently, for example, the AT&T toll network uses an algorithm called Real Time Network Routing (RTNR) that allows calls to be one or two hop. Approximately 5% of the links are reserved for one-hop calls because it was found that, without some reservation for one-hop calls, the network could become stable with almost all calls being two-hop calls, and this severely restricts network capacity. Employing the principles disclosed herein, however, no reservations are needed because one can drop the two-hop calls when necessitated by network load conditions. Thus, a very heavily loaded network would rapidly migrate toward all one-hop calls, yielding maximum call handling capability. In short, the method disclosed herein works better for all network load conditions. It may be noted that one could also drop calls based on multiple hops (i.e., more than two), and on expected long holding times; for example, calls to 800 numbers that normally have long queues of people waiting to talk to a representative are calls with expected long holding times.

The process described in connection with FIGS. 2 and 3 needs to be repeated for each one of the serially connected overloadable resources of a path. For example, when terminal 45 desires to establish a voice connection, and a determination is made relative to one of the resources, for example, resource 51, the determination may be that resource 51 has a) sufficient capacity—leading to the conclusion that a call may be admitted unconditionally, b) less than the lowest threshold for this resource—leading to the conclusion that a call cannot be admitted, or c) an in-between capacity—leading to the conclusion that a call can be admitted, but only if another call is dropped.

The only conclusion that is not tentative is the second one (decision to not admit the call). The other conclusions are tentative because they are subject to conclusions that are reached in the next overloadable resource in the serial connection of the path. Ultimately, the decision for a path is either (i) to drop the attempted call (i.e., decline to admit it) if any of the individual conclusions are in category (a) above, (ii) to admit the attempted call without effect on existing calls, but only if none of the individual conclusions were in category (c) above, or (iii) to admit the call subject to a call dropping algorithm.

Figure 4:
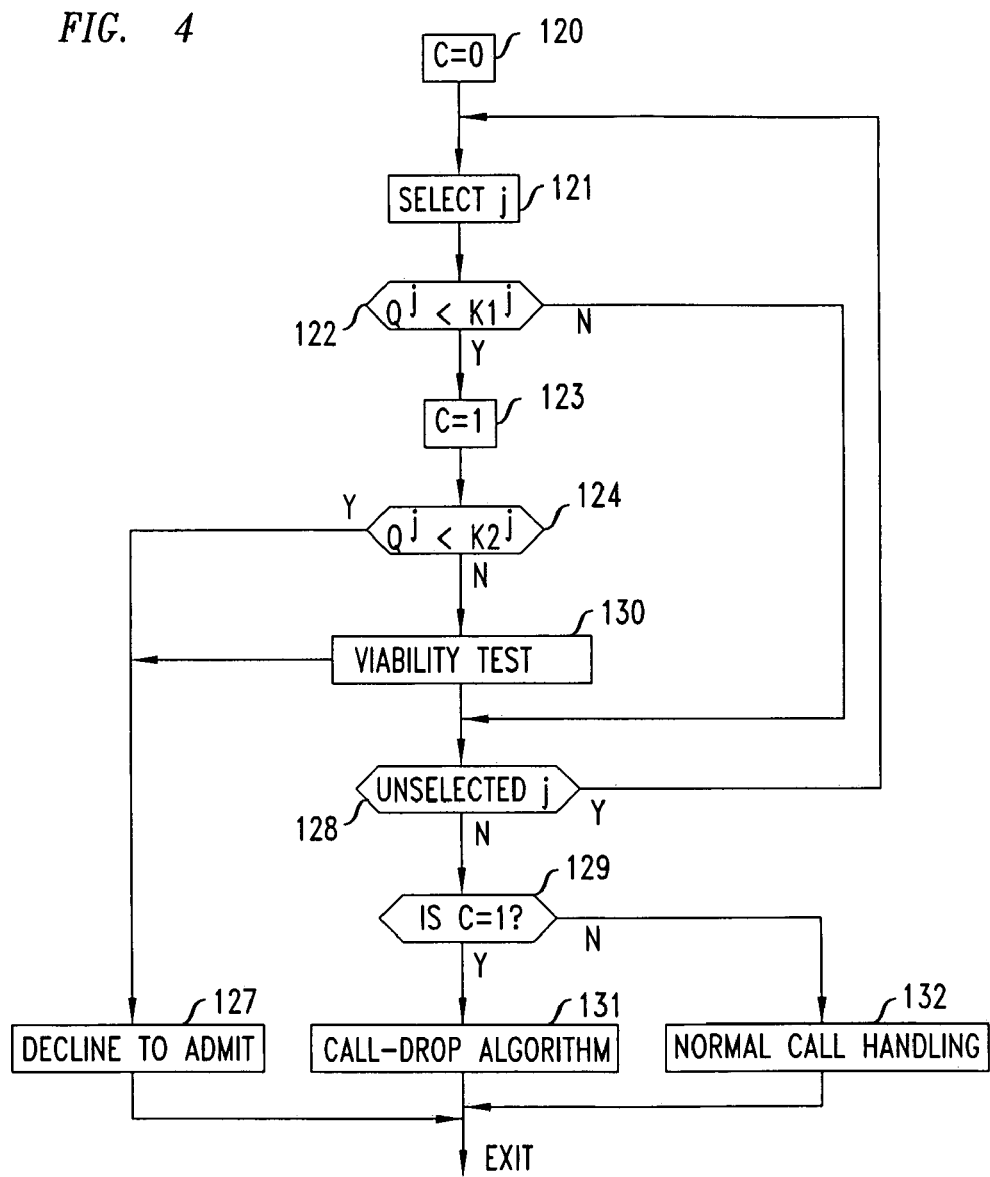
FIG. 4 illustrates an approach for the second call-dropping algorithm depicted in FIG. 3.

The above is illustrated in FIG. 4, where the process begins with step 120 where variable C is set to 0. In the course of the algorithm, C is set to 1 when a determination relative to a resource is that is fails to have sufficient capacity; i.e., is in category (b) or (c) above. Having set C to 0, control passes to step 121, which selects a previously unselected index j, corresponding to a particular resource in the path, i.e., $Q^j$, and passes control to step 122, where it is ascertained whether the number of resources that are available in that resource (for example, on cable 51) has reached or fallen below an upper threshold for that resource $K1^j$. When so, control passes to step 123. Otherwise, control passes directly to step 128 where, if it is determined that additional previously unselected index values exist, control returns to step 121 to select another previously unselected index (for example, the index that corresponds to the overloadable resource that is path 30).

If the process continues to cycle only through steps 121, 122, and 128 until no previously unselected index values exist, control passes to step 129, from where control passes to step 132, because the value of logical variable C is still 0. Step 132 effects normal call handling of an attempted call; that is, admits the call.

When control passes to step 123, variable C is set to 1, which indicates that if the attempted call will be admitted, it will be admitted subject to a call-dropping algorithm. The steps that follow determine only whether the tentative decision to admit the call, subject to another call being dropped, will stand or give way to declining to admit the call at all.

Following step 123, control passes to step 124, where it is determined whether the available resources fall below a lower threshold, K2, for that resource. When the conclusion is that the available resources are below the threshold, control passes to step 127, which declines to admit the call, and exits the process. When step 124 determines that the available resources have not fallen below the threshold, control passes to step 130, which considers whether it is still advisable to admit the attempted call (even subject to the aforementioned dropping of an existing call). One simple implementation of step 130 is the determination as to whether the attempted call is a voice call. If it is, dropping an existing call is determined to be still advisable, and control passes to step 128. Otherwise, control passes to step 127.

Finally, when control passes from step 128 to step 129, the latter determines whether C equals to 1. When C is equal to 1, control passes to step 131 where a predetermined call-dropping algorithm is executed, and when C is still equal to 0, control passes to step 132.

It is noted that the method depicted in FIGS. 2 and 4 is carried out seriatim for each SOR, but only in the serial connection of the SORs in the FIG. 1 arrangement that is relevant to the terminal that seeks to establish a connection. For example, when telephone 45 seeks a connection, the assessments are made only relative to paths 51 and 20, and not to path 52.

Should a decision be reached to drop an existing call (in steps 131, or 253) various different algorithms may be employed, based on whatever criteria a designer of a system deems appropriate. For example, when considering path 51 and then path 30 because a terminal on path 51 is attempting to establish a connection, and the latter consideration leads to the conclusion that an existing call must be dropped, a designer may choose to drop a data call only from the set of calls that flow through both path 51 and 30. Alternatively, a designer may choose to drop a data call that is randomly selected, or a designer may choose to drop a call from path 51, or path 52, depending on which path is more heavily occupied with data calls.

Figure 5:
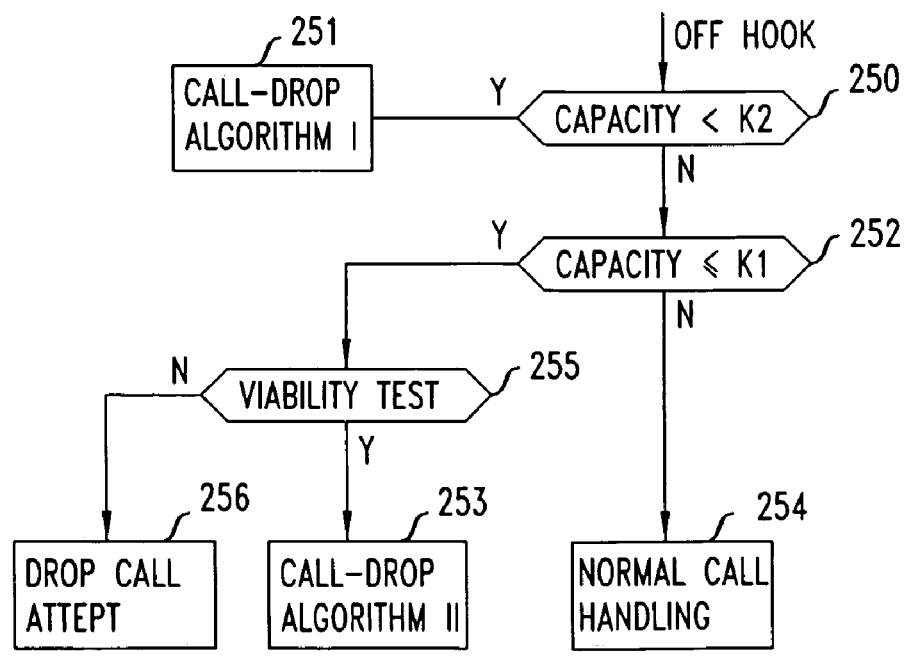
FIG. 5 is a flow chart of a method where, before an algorithm is executed to determine which call to drop, a test is performed to determine whether it is advisable to accept the attempted call.

The above-disclosed method operates well, but it has been found that, at times, it unnecessarily penalizes data calls by dropping such calls when capacity reaches or falls below the K1 threshold. This results in an undesirably large probability that an ongoing data call will be prematurely disconnected by the system. What we have concluded is that it is better to view the fact that capacity fell to between thresholds K1 (or K2) as an indication that congestion exists, but the decision as to whether to drop an existing data call when a new voice call is presented should not be automatic but, rather, should be related to one or more other factors, such as the number of data calls that are already present. FIG. 5 presents an illustrative embodiment, which effectively duplicates the FIG. 2 process but augments step 253 is with an initial determination, in step 255, whether it is advisable to admit the attempted call at the cost of dropping an existing call. When step 255 determines that such action is inadvisable, control passes to step 256, which declines to admit the attempted call. Otherwise, control passes to step 253 that decides which call to drop.

Figure 6:
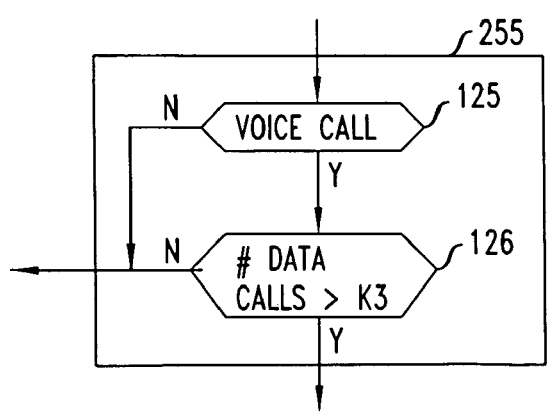
FIG. 6 presents one embodiment of the viability FIG. 5 viability test.

FIG. 6 shows one embodiment for the determination that is performed within step 255, which comprises steps 125 and 126. In step 125, a determination is made whether the attempted call is a voice call. If so, it is concluded that admitting the attempted call may still be a viable option, and control passes to step 126. Otherwise, i.e., if the attempted call is a data call, it is concluded that the service cost associated with dropping an existing call is too great, and the attempted call is not admitted. In step 126, a determination is made whether the number of existing data calls exceeds a threshold K3. If so, it is concluded that there are a large enough number of data calls to make it advisable to drop one of the existing data calls and to admit the attempted voice call instead.

Of course, the principles of this approach are directly applicable to the flowchart presented in FIG. 4, with viability test step 130 carrying of the tests suggested in the FIG. 5.

It should be noted that the viability testing presented in connection with FIG. 6 is merely illustrative, and that those who are skilled in the art may employ other tests. For example, in systems where the type of the call (whether voice, or data) is not considered, or is not maintained once the call is admitted, the criterion may be whether a call exists that exceeds a duration threshold of K3 seconds. Also, in systems where numerous call types are handled, and where the information about the type of each admitted call is maintained, the call duration criterion can be also employed and, actually, different duration thresholds can be applied to different call types. To illustrate, the values of K3 for voice calls, data calls, and emergency phone calls might be selected so that $K3_{voice\ calls} < K3_{data\ calls} << K3_{emergency\ calls}$.

It may be noted that there are only two pieces of information that are available during a call attempt for classifying a call: the called number, and the calling number. Illustratively, a switch can maintain a list of emergency called numbers (for classifying emergency calls), and a list of prespecified "data calls" called numbers (for example, of dial-in modem banks of ISPs). All other called numbers can be classified as voice calls. Similarly, a switch can maintain a list of emergency calling numbers (for example, telephone numbers of mobile phones in ambulances) and a list of "data calls" calling numbers (for example, from home office lines that are used by computers). The list of "data calls" calling and called numbers might be augmented based on historical data on holding times from and to those numbers, respectively.

A rule of thumb for choosing the value of K3 may be the expected value, plus two standard deviations of the number of busy lines tending to data calls in a hypothetical system with an infinite number of lines, and arrival rate that yields the required long term blocking rate for the given finite system. This value is easily computed from queuing formulae for infinite server queues.

The above disclosures are couched in terms of a switched network, where calls have associated call set-ups. However, the disclosed principles are not limited to the switched network. In fact, these principles are applicable to packet networks that employ the notion of a connection, and admission control processes, such as in ATM networks. In such a network, a "busy" can mean a non-responding server, or one that is server busy and responds very slowly. To identify this condition, the end router has to snoop on packets flowing from the server to find the server's busy condition, and would need to use a timer to determine when the server is not responding. The end-router could communicate the busy condition of the server to the originating router, and the originating router could then delay admission, which is the equivalent of delaying dial tone, of subsequent, closely spaced, attempts to the same server. Additionally, the notion of dropping a data call, can be extended to not only doing a full disconnect, but also to suspending the flow of packets for, perhaps, a second to allow other connections to proceed. The idea of a large hop count still applies. The product of the hop count multiplied by the bandwidth required is a figure of how much network resource is being used, and connections where this product is very high are prime candidates for being dropped or suspended. This, again, will cause an overloaded network to tend toward short hop calls, thereby mitigating the network overload.

The above discloses the principles of our invention, but it should be realized that various modifications and enhancements can be incorporated by those who a skilled in the art without departing from the spirit and scope of the invention, as defined by the appended claims. To illustrate, the above description handles threshold K1 as a fixed variable, but it does not need to be so. It can be a threshold that is related to the state of the system or, stated differently, to the direction from which the threshold is being approached. For example, a system designer may choose to have a value of K1 when it is approached from a state of where capacity is greater than K1 (i.e., K1') to be smaller than when it is approached from a state where capacity is smaller than K1 (i.e., K1"); in other words, K1'<K1". This provides a hysteresis, which reduces the oscillations from call-drop control intervals to no call-drop control intervals. To give another example, various criteria for selecting the call to be dropped were described, but still other criteria are possible, such as criteria based on the identity of the client that is attempting to make a call, or client of the call that may be dropped. It is likely that a system designed might like, for example. to insure that any given client is not unduly picked for dropping of calls.

The invention claimed is:

1. A capacity management arrangement executed in an arrangement that includes a resource provider and a first plurality of resource users, where each of said resource users being adapted to reach said resource provider through a channel in a shared resource that includes a second plurality of said channels, said method being executed when user A of said resource users desires to access said resource provider through one of said channels, comprising the steps of:

(a) when number of unoccupied channels of said second plurality of channels is below threshold K2, where K2 is a preselected number, declining to provide said access to said user A;

(b) when number of unoccupied channels of said second plurality of channels is between threshold K2, and threshold K1, where K1 is a preselected integer greater than K2, executing an algorithm that includes action of (i) dropping an existing connection between one of said resource users to said resource provider, thereby creating an unoccupied channel, and includes a connection for said user A to said resource provider through an unoccupied one of said channels, or (ii) declining to provide said access to said user A; and (c) otherwise, establishing a connection for said user A through an unoccupied one of said channels.

* * * * *